Aug. 7, 1962  C. L. STEEN  3,048,810
COUPLING FOR CONDUCTOR CORD PLUGS
Filed Dec. 31, 1959

Charles L. Steen
INVENTOR.
BY
Attorneys

United States Patent Office 3,048,810
Patented Aug. 7, 1962

3,048,810
COUPLING FOR CONDUCTOR CORD PLUGS
Charles L. Steen, 1530 Downing St., Denver, Colo.
Filed Dec. 31, 1959, Ser. No. 863,210
3 Claims. (Cl. 339—75)

The present invention relates to certain new and useful improvements in a special purpose coupling, that is, a coupling which is expressly constructed and effectually adapted to accommodatingy receive and securely hold male and female terminal plugs such as are commonly attached to connectible ends of current conducting cords, for example, appliance-type extension cords.

The problem involved in satisfactorily maintaining cord plugs joined especially when current is passing therethrough has, of course, existed for some time. This situation is evident by reason of the fact that numerous attempts have been made by persons engaged in this line of endeavor to effectively prevent the accidental separation of cord plugs once they have been intentionally joined together by hand. Not only it is desirable to shield and insulate the interconnected plugs, it is just as important to be able to apply and remove the coupling means so that if one desires to get the extension cord or the appliance cord out of the way the desired result can be accomplished with a minimum of effort and, of course, without the exasperation which attends the use of hard-to-use accessories and equivalent mechanical aids. The fact that terminal plug holders do not appear to have met with widespread adoption and use implies, at least, that the desired coupling has not yet been introduced. The obvious purpose here is to evaluate the problem and to provide an adaptable coupling which renders the interconnected plugs self-anchoring within the confines of the receptacle or receiver portion of the coupling.

In carrying out the principles of the invention a coupling has been evolved and produced which makes for quick connect and disconnect usage, the joint between the plugs being maintained at all times and insuring positive and reliable passage in delivery of electrical current. Then too, the construction is such that it lends itself to practical and efficient use for heavy duty plugs and may also be adapted for miniaturized needs where retentive efficiency in a small coupling is vital lest good performance will not be had.

With a view toward stepping up efficiency in this constantly advancing line of endeavor, a simple economical ellipsoidal rubber or an equivalent elongated body is used. It is preferably of rubber or moldable commercial plastics. In the two embodiments employed, one is the snap-on type wherein the inherent properties serve to lodge the plugs in the pocketing recesses provided therefor. The other embodiment is one wherein retentive resiliency alone is not depended on but relies on the provision of a simple lace similar to a shoe lace and which is held in place by hooks provided on adaptable lip portions along the edges of a constantly open slot in the body of the coupling.

Briefly, the concept has to do with a readily applicable and removable coupling comprising an elongated hollow body, the hollow portion of which constitutes a receiving and retaining pocket for said plugs after they have been "plugged" and connected together by hand, the end portions of said body having axially bored neck portions whose bores accommodate and permit passage of the intended cords and also communicate with the respective end portions of said pocket, said body having a lengthwise slot in one side opening inwardly into the pocket and bores respectively and opening at an outer end through the adjacent peripheral surface of the body, said slot being relatively wide and constantly open and serving to uncover and expose portions of the plugs and cords and also serving to facilitate carrying out the steps of readily applying and removing the coupling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
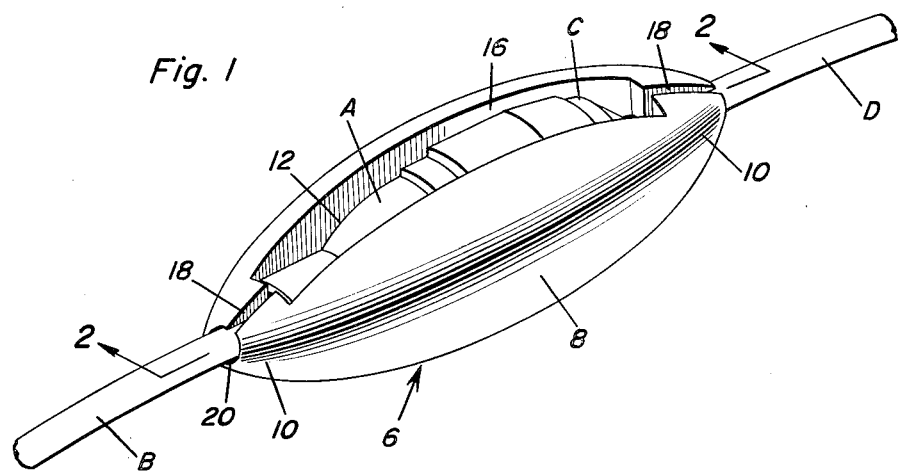
FIG. 1 is a view in perspective of one embodiment of a safety type coupling for terminal plugs illustrating how it is precisely constructed and used for efficiency-assuring results.
Figure 2:
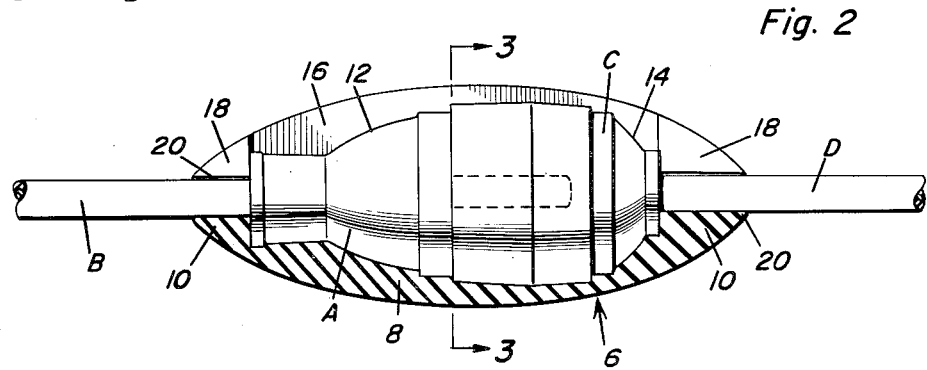
FIG. 2 is a view taken on the longitudinal section line 2—2 of FIG. 1, looking in the direction of the arrows.
Figure 4:
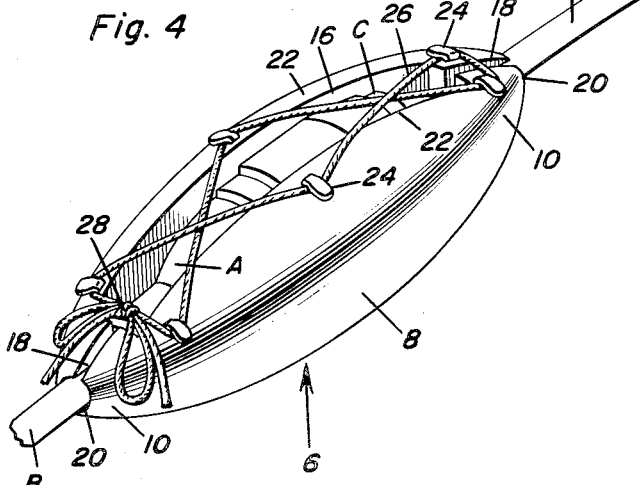
FIG. 4 is a view in perspective which shows substantially the same coupling seen in FIG. 1 except that lace means is added for extra retaining needs whenever necessary or desired.
Figure 3:
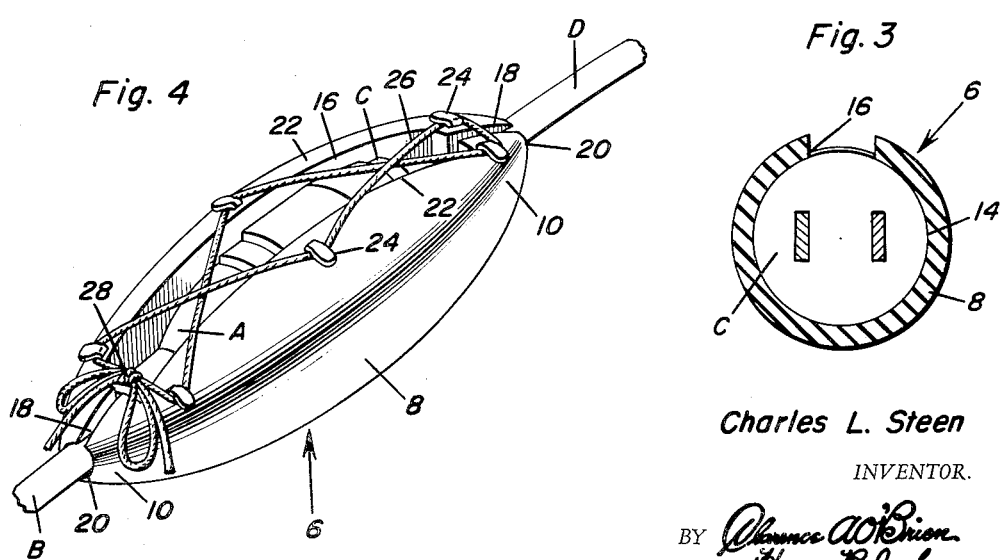
FIG. 3 is a cross-section on the line 3—3 of FIG. 2.

By way of introduction to the description of the details it is to be explained that the same theme of the inventive concept applies, generically speaking, to the two fully shown embodiments of FIGS. 1 and 4 respectively. Therefore, the same or like reference numerals will be applied to like parts here to facilitate an understanding in respect to the generic aspects and also as to the distinguishing characteristics. To this end the elongated bulbous or ellipsoidal body, which goes to make up the significant part of the over-all coupling, is denoted by the numeral 6. The median or body portion is comparatively stout and therefore is largest at the transverse center and this portion is denoted at 8. It gradually decreases in cross section and the respective ends terminate in truncated conical neck portions 10 which are the same at each end. The body is of hollow construction and the "hollow" defines either a chamber or a pocket. This pocket constitutes a receiver and also a retainer for the terminal plugs. The male plug at the left is denoted at A and is mounted on the electrical conductor or cord B. Its prongs extend into sockets provided therefor in the female terminal plug C carried by the end of the wire or cord D. It can be assumed that these "cords" are appliance current conductors of any suitable construction and that the plugs A and C are also of suitable construction. Since there is no "standard" as to exact exterior shape and contour no shapes will be mentioned. However, it will be observed that the left hand half-portion of the plug A has its wall portion shaped as at 12 to accommodatingly fit the plug A. The corresponding portion 14 at the right is shaped to fit the plug C.

An open slot radiates from the hollow center and passes through the periphery and is denoted at 16, the restricted end portions 18 registering with the correspondingly restricted bores or passages 20 for the conductors. The connector or coupling 6 in FIG. 1 is of compressibly resilient rubber of requisite gauge and is of the snap-on type.

In the modification in FIG. 4 of the lip portion 22 are provided with hooks 24 to accommodate the coacting portions of the attached lace with the lacing 26 passing over the slot and the end portions knotted and tied together at 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A readily applicable and removable coupling adapted to render separably interconnected male and female terminal plugs self-anchoring within the confines of said coupling comprising an elongated one-piece egg-shaped hollow body of insulation material, the hollow portion of which constitutes a retaining and insulation pocket for said plugs after they have been intentionally and cooperatively connected together by hand, said body having axially bored reduced neck portions whose bores serve to accommodate and permit passage of cords carried by said plugs and also communicate with the respective end portions of said pocket, said body having a lengthwise slot in one side commensurate in length with the length of said one side and opening radially into the pocket and bores respectively, said slot being relatively wide and constantly open and serving to uncover and expose portions of the plugs and cords at all times and also serving to facilitate carrying out the steps of readily applying the coupling to the interconnected plugs, subsequently removing the coupling, the end portions only of the slot being narrow and in relative proportion to the cross-sectional dimension of the neck portions.

2. The structure defined in claim 1, and wherein the walls of said pocket have a recessed half-portion at one end contoured for reception of the female plug and also a similar but distinguishable recessed half-portion at the other end for conformable reception and retention of the male plug, each recess being precisely shaped to conform with the given contoured shape of the particular plug which is adapted to be fitted therein.

3. The structure defined in claim 2, and wherein the lip portions along the edges of said slot are provided with spaced exteriorly available hooks, and a readily applicable lace separably laced over the hooks and having free ends tied together, the lacings bridging the major portion of said slot.

References Cited in the file of this patent

UNITED STATES PATENTS

| | | |
|---|---|---|
| 681,470 | Wolff | Aug. 27, 1901 |
| 1,765,035 | Stubbs | June 17, 1930 |
| 1,921,447 | Barnett | Aug. 8, 1933 |
| 2,229,849 | Heidebrecht | Jan. 28, 1941 |
| 2,267,630 | Weiland | Dec. 23, 1941 |
| 2,662,953 | Barker | Dec. 15, 1953 |
| 2,720,633 | Westberg | Oct. 11, 1955 |
| 2,721,313 | English | Oct. 18, 1955 |
| 2,725,543 | Tanner | Nov. 29, 1955 |